United States Patent
Fox et al.

(10) Patent No.: US 7,251,746 B2
(45) Date of Patent: Jul. 31, 2007

(54) AUTONOMOUS FAIL-OVER TO HOT-SPARE PROCESSOR USING SMI

(75) Inventors: Thomas James Fox, Apex, NC (US); Eric R. Kern, Durham, NC (US); Michael Scott Rollins, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 10/761,721

(22) Filed: Jan. 21, 2004

(65) Prior Publication Data

US 2005/0172164 A1 Aug. 4, 2005

(51) Int. Cl.
*G06F 11/00* (2006.01)

(52) U.S. Cl. .......................................... 714/13; 714/11

(58) Field of Classification Search .................. 714/13, 714/11, 12

See application file for complete search history.

(56) References Cited

U.S. PATENT DOCUMENTS 5,251,299 A * 10/1993 Masuda et al. ............... 714/10
5,898,829 A * 4/1999 Morikawa ..................... 714/47
6,138,247 A * 10/2000 McKay et al. ................ 714/10
6,240,526 B1 * 5/2001 Petivan et al. ................ 714/11
6,931,568 B2 * 8/2005 Abbondanzio et al. ....... 714/11

* cited by examiner

*Primary Examiner*—Dieu-Minh Le
(74) *Attorney, Agent, or Firm*—Cynthia S. Byrd; Dillon & Yudell LLP

(57) ABSTRACT

A method and system for dynamically replacing a failing processor in a server system configured with IA-32 architecture without requiring hardware changes to the IA-32 architecture or administrative effort. At least one processor of the multiprocessor system (MP) is initially provided as a reserve (or hot-spare) processor that remains in an idle, off, or low-power mode. While in that mode, the OS is prevented from initially utilizing the hot-spare processor. When a processor failure is detected, SMI code running on a good processor instructs the OS to hold off allocating processes to the failing processor. Contemporaneously, the SMI (and OS) activates and completes an initialization of the hot-spare processor to prepare it to begin receiving the held-off processes. Control is then returned to the OS, which updates the "active" processor list and allocates the threads that were running on the failing processor to the hot-spare processor.

19 Claims, 4 Drawing Sheets

AUTONOMOUS FAIL-OVER TO HOT-SPARE PROCESSOR USING SMI

BACKGROUND OF THE INVENTION

1. Technical Field

The present invention relates generally to data processing systems and in particular to system response to processor failure in a multi-processor data processing system. Still more particularly, the present invention relates to a method and system for dynamically activating a spare processor when processor failure is detected in a multi-processor data processing system.

2. Description of the Related Art

Conventional data processing systems are often configured with multiple processors interconnected to each other and other system components. These multiple processors may exist on a single chip or may be manufactured on separate chips. The processors operate in tandem to efficiently complete tasks associated with application code being executed. Those skilled in the art are familiar with the various configuration and operations of multiprocessor systems (MPs).

Occasionally, while a system is running and the processors are executing application code, one (or more) of the processors may fail (i.e., begin to provide inaccurate processing results and/or begin operating outside of pre-established or "ideal" operating parameters, etc.). When such processor failure occurs, the system's technician has to replace the failing processor (or processor chip) with a new one in order to maintain the level of processing desired for the system. This changing of processors is normally a manual operation, which requires the technician to halt all executing processes (across the system including the operating system (OS)), shut down the MP, obtain a new/replacement processor, complete the switch out of the failing processors, reboot the system, and then restart the executing processes across the MP.

During the system reboot, the replacement processor is recognized by the MP's BIOS (basic input/output system) and activated for operation within the system. Conventionally, the failed (or failing) processor is physically detached (or removed) from the system bus (or interconnect), and the replacement processor is connected (plugged-in) to the interconnect in place of the removed processor. This replacement method is convenient when non-critical processes are being completed on the MP; however, the time required to replace the processor and downtime in processing is unacceptable for critical processes that require continuous up-time of the MP.

Also, with current replacement methods, a separate replacement processor is required to be plugged-in after the failure condition is detected. This requires a technician to swap out the failed processor with the replacement, and as described above, the OS and executing processes are halted until the swap of the processors is completed.

The traditional method of responding to processor failure severely limits the ability of larger systems (e.g., multiprocessor server systems) with non-failing processors to continue executing despite the presence of the failing processor. In lager server systems that require continuous up-time, replacement of a failing processor has to be completed without shutting down the entire system. Typically, in a server system, when a processor begins to fail, the processor must be taken out of the processing pipeline and replaced by another processor to avoid the entire MP crashing. Depending on the built-in redundancy and complexity of the MP, such a temporary removal may have wide ranging effects, from slightly degrading the overall performance of the MP to temporarily removing the MP from service.

Currently, manufacturers of server systems provide different types of server architectures, with common architectures being the S/390 architecture and the Intel Architecture-32 bit (IA-32). The S/390 architecture has a machine instruction for switching to a backup processor, while IA-32 does not have a similar machine instruction. Rather, IA-32 is designed with the functionality to generate an SMI (Systems Management Interrupt) after a CPU fault. Generation of SMIs for standard system management tasks is unique to the IA-32 and the process is described in detailed in U.S. Pat. No. 6,625,679.

Realizing that shutting down the entire MP and then restarting all processes is an unacceptable method of handling single processor failures, manufacturers designed some conventional MPs with a failure response mechanism that involves a hot-spare processor and hardware changes to the system architecture to support processor failure conditions. Implementation of the failure response mechanism is based on the type of server architecture.

U.S. Pat. No. 6,115,829 provides a hot spare processor for solving processor problems relating to the S/390 architecture. The solution involves the utilization of a hardware instruction built into the processor that is usable only by millicode. Since the problems in the S/390 architecture are specific to that architecture, the above solution is not available to the IA-32 architecture, which has a different processor configuration and exhibits a different set of processor problems. Those skilled in the art are familiar with the functional and architectural differences in the two types of architectures and appreciate that different response methods unique to each architecture must be implemented for processor failure.

As another example, U.S. Pat. No. 4,819,232 provides a hardware instruction for software programs to utilize when completing fault recovery to a spare processor from the primary processor. Implementation of this process in an IA-32 system would require architecture (hardware) changes to current IA-32. Another patent, U.S. Pat. No. 5,155,729 provides a redundant processor that engages in a ping-ponging process with the primary processor during a hot swap condition. This process is also specific to the S/390 architecture and not provided within the IA-32 architecture. Finally, U.S. Pat. No. 6,370,657 places the system into standby prior to hot-swapping the processors; however, the response mechanism does not provide a hot-spare nor does it provide a means to keep the OS running during the switch between processors.

With server systems, processor downtime is an undesirable condition, and thus a fast fault-response mechanism/scheme is required. It would be desirable for such a scheme to include the ability to detect when one of the multiple processors has failed. Additionally, when a processor failure has been detected, it would also be desirable for the fault-response mechanism to quickly respond to the failure by providing a replacement processor without the system having to suspend processing and with minimal disruption to the overall system. The present invention recognizes that it would be desirable to provide a processor failure response mechanism that provides a replacement processor in a seamless manner so that executing processes and the OS continue executing during dynamic replacement of the failed processor.

SUMMARY OF THE INVENTION

Disclosed is a method and system for dynamically replacing a failing processor in a server system configured with IA-32 architecture without requiring hardware changes to the IA-32 architecture or administrative effort. The method enables a system to remain operational, i.e., continue executing operating system (OS) processes and application processes on the other processors, while the failing processor is automatically de-activated and a replacement processor is dynamically activated. Negligible system downtime occurs during the transfer of executing threads/processes to the replacement processor, unlike other methods which require temporary halting of the OS processing and, in some instances, halting all other processes across the system.

Implementation of the invention involves the utilization of Systems Management Interrupt (SMI) functionality provided within basic input output system (BIOS) of the IA-32 architecture. At least one processor of the multiprocessor system (MP) is initially provided as a reserve (or hot-spare) processor that remains in an idle, off, or low-power mode. While in that mode, the OS is prevented from initially utilizing the hot-spare processor. When a processor failure is detected, SMI code running on a good processor instructs the OS to hold off allocating processes to the failing processor. Contemporaneously, the SMI (and OS) activates and completes an initialization of the hot-spare processor to prepare it to begin receiving the held-off processes. Control is then returned to the OS, which updates the "active" processor list and allocates the threads that were running on the failing processor to the hot-spare processor.

Thus, a processor is able to autonomically fail-over to a hot-spare processor without affecting the OS or executing applications. The invention substantially eliminates the problems related to high availability during single processor failure without crashing all of the processors. Further, the invention completes this processor replacement without requiring specialized OS or middleware features. Finally, the invention provides a method for dynamic, hot swap of spare processors without the need of processor architecture changes. That is, no special hardware instruction is built into the processor, as in other methods.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method for dynamically replacing failing processors in a IA-32 configured multiprocessor computer system (MP) by providing the MP with a spare processor that is initially held-off and is later brought into the group of executing processors whenever one of the main processors is detected as failing. The invention provides a substantially seamless transfer of executing processes from the failing processor to the replacement processor, without halting the execution of the operating system (OS) and/or applications on the overall MP. That is, a failing processor is able to autonomically fail-over to a hot-spare processor without affecting the OS or executing applications. The failure response method of the invention is completed without requiring special hardware instructions built into the processors.

Figure 1:
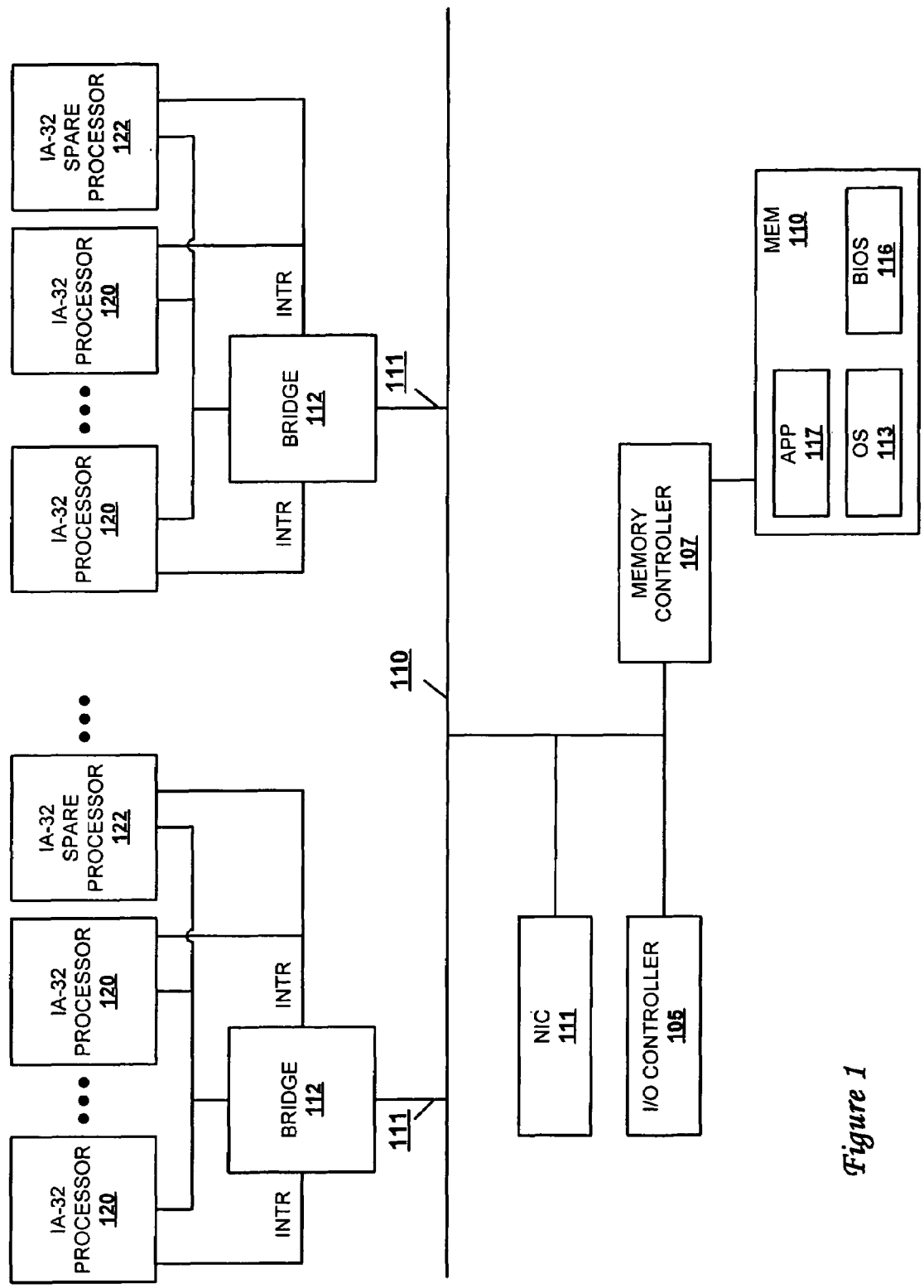
FIG. 1 is a block diagram of a multiprocessor computer system (MP) designed according to IA-32 architecture and a spare processor according to one illustrative embodiment of the present invention.

With reference now to the figures and in particular to FIG. 1, there is illustrated a multiprocessor system (MP) designed with a spare processor and other components that enable the implementation of the various features of the invention. MP 100 is designed according to IA-32 architecture and comprises an IA-32 processor system 120 coupled to system components by a bridge 112. The IA-32 processor system 11 may include one or more processors 120, 122 that perform various computing functions. The processors 14 are coupled to a common bus 114, and may be coupled to a local advanced programmable interrupt controller (APIC) bus (described below). The processors 120, 122 share access to the common bus 114, and may also share other resources such as memory, input/output (I/O) devices, and interrupt handlers, for example. The system components provide enhanced functionality, and can be used with the existing IA-32 processors 120, 122, provided that appropriate hardware and/or software is used to ensure compatibility between the IA-32 processor system and the system components MP 100 also comprises a spare processor 122. The processors are interconnected to each other via processor interconnect 114. Each processor 120, 122 comprises service processor logic (not shown), which communicates with other service processors of other processors as well as bus/interconnect logic (e.g., bridge 112) to allow the processors 120, 122 to operate in a coherent manner with each other and the rest of the MP 100.

Figure 2A:
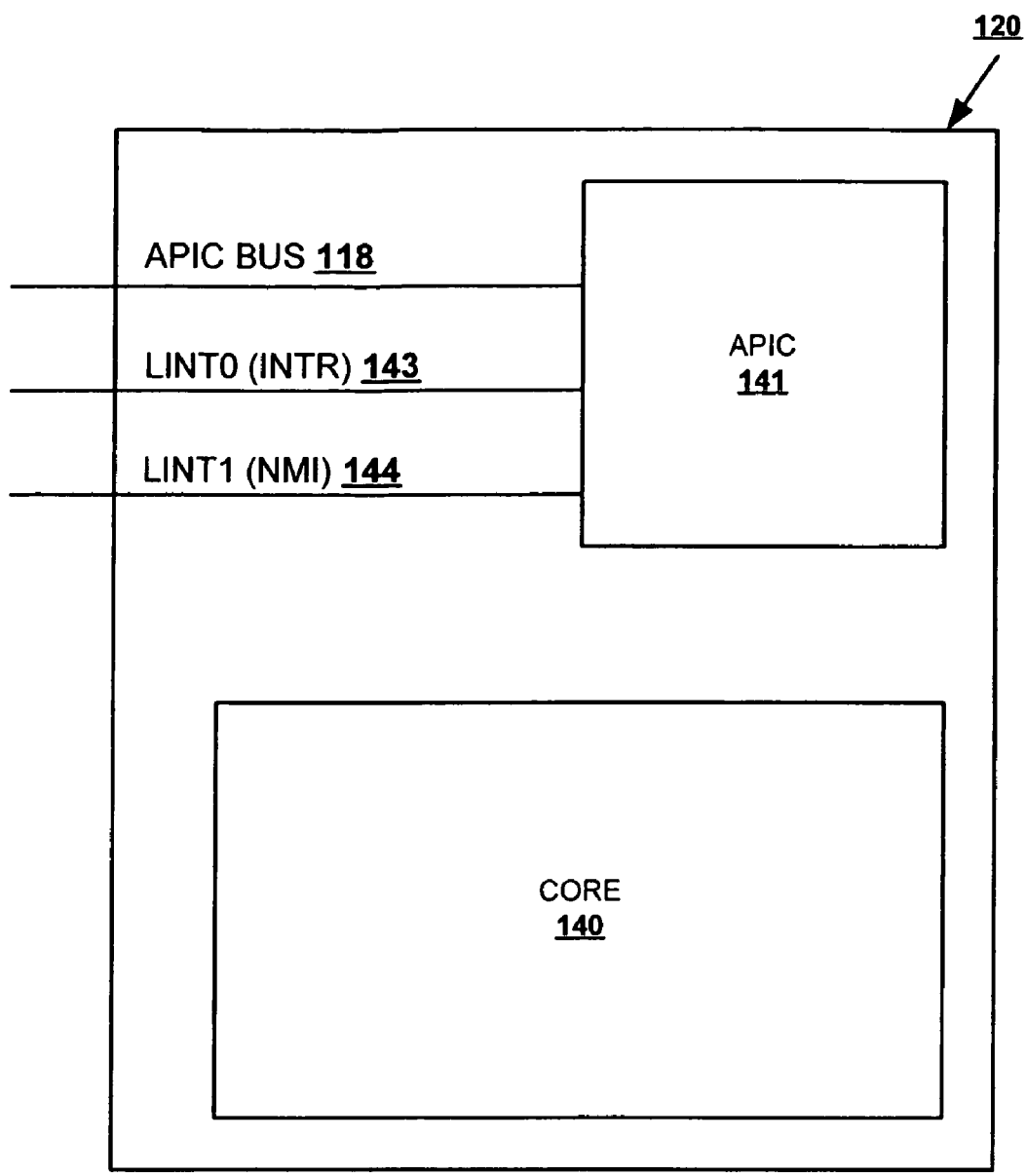
FIG. 2A is a block diagram depicting two major internal components of one of the IA-32 processors of FIG. 1A, according to one illustrative embodiment of the present invention.

As shown by FIG. 2A, each processor 120, 122 includes a core unit 140 that controls processing on the processor 120, 122 and an APIC 141 that processes external and normal interrupts that the processor 120, 122 may receive at its interrupt pins 143 and 144. APIC 141 also includes a connection to the APIC bus 18, used to deliver interrupts to the application processors. The interrupt pins 143 and 144 may be programmed to receive specific types of interrupts.

The system components include one or more I/O controllers 105, which are coupled to a memory controller (MC) 107. The I/O controllers 105 are coupled to I/O device buses 109. The buses 109 may include a peripheral computer interface (PCI) bus, for example, the buses 109 may connect standard computer peripherals such as a keyboard.

Coupled to MC 107 is a system memory 110, within which is stored software for controlling the MP and executing application processes. These software include: the OS 113, BIOS 116, which includes SMI, and program applications 117. SMI notifies the OS of additional processor resources within the MP (i.e., increase/decrease in number of processors) as well as addition/removal of other system resources (i.e., memory and I/O, etc.).

A system bus 110 connects the memory controller 107 and other components to IA-32 processors 120, 122, via bridges 112, and processor buses 114. The IA-32 processors 120, 122 and the bridges 112 are grouped at nodes 111.

The bridge 112 takes the interrupts that are being delivered over the system bus 110 and signals the interrupt to the appropriate IA-32 processor 120, 122. To ensure that a particular interrupt reaches the appropriate IA-32 processor 120, 122, all interrupt transactions on the system bus 110 contain target node 111 and IA-32 processor identification.

Software may initialize the I/O controllers 105 to transfer an interrupt transaction in a manner that identifies the IA-32 processor 120, 122 to be interrupted. The bridge 112 that is connected to the same processor bus 114 as the destination IA-32 processor 120, 122 recognizes the interrupt transaction, and asserts an interrupt pin at the targeted IA-32 processor 120, 122.

During operation, the OS and software code from the program application are executed by the processors to complete specific tasks or functions associated with the application. The processors are interconnected to the other components (memory, etc.) via system interconnect 110. Interconnect fabric 110 includes wires and control logic for routing communication between the components as well as controlling the response of the OS of MP 100 to changes in the hardware configuration. In the present invention, BIOS comprises processor failure response logic 207, which generates the SMI, and configuration setting logic 209.

Figure 2B:
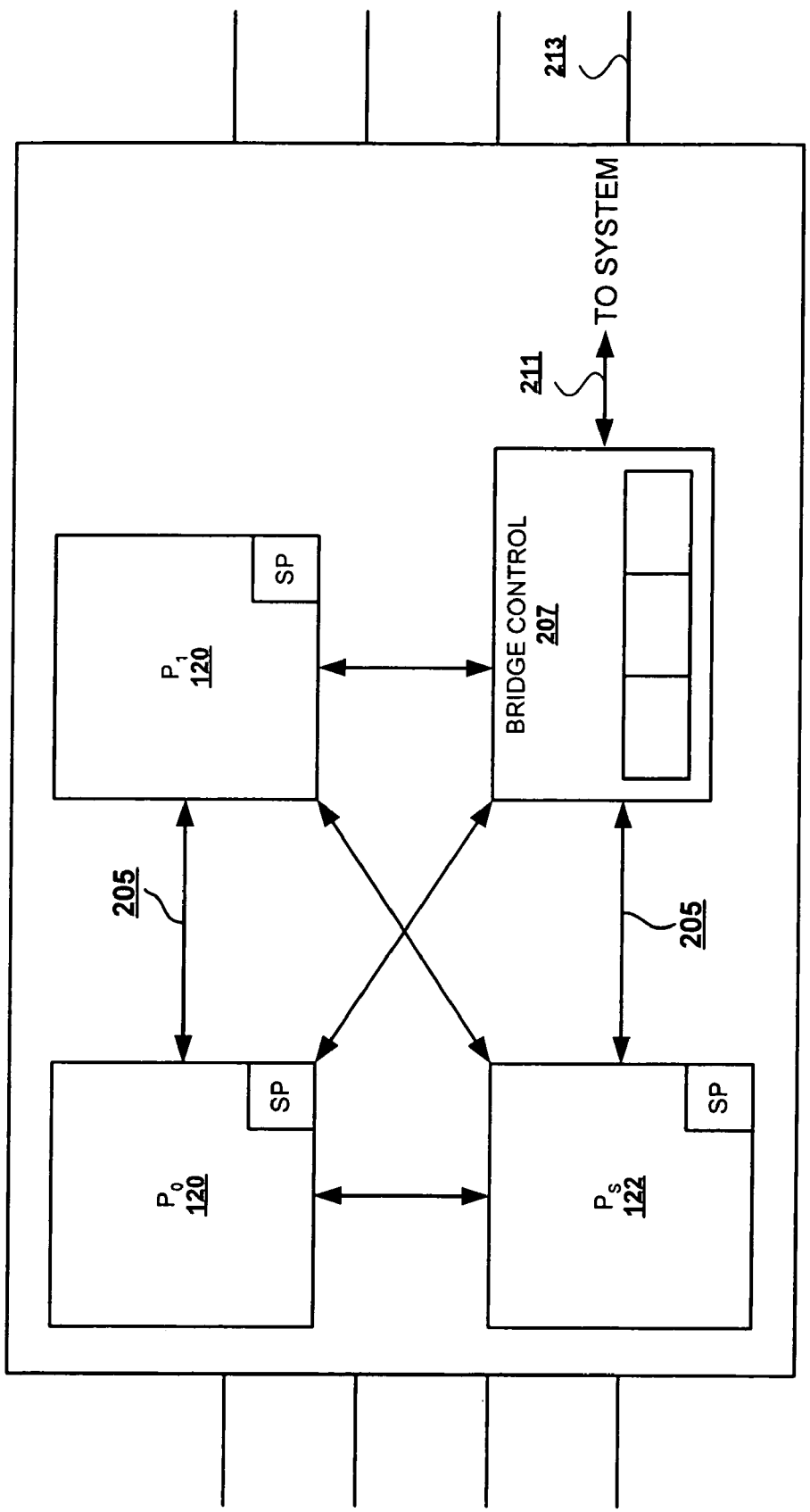
FIG. 2B is a block diagram of a multiprocessor chip designed with dual IA-32 processors and a spare IA-32 processor to enable dynamic switching out of a failed processor during failure response in accordance with one embodiment of the present invention.

FIG. 2B provides a block diagram representation of a multiprocessor chip designed with main IA-32 processors 120 and a spare processor 122. Also provided with MP chip 200 is a register 209 for tracking active processors on MP chip 200, as described below. In one alternate implementation, processors 120, 122 are interconnected to each other via processor-to-processor buses 203. Processors 120, 122 are also connected to bridge (bus controller) 207 via individual control buses 205. Control buses enable transfer of control data from the bus controller that indicates which processor is active within MP chip 200. Control bus then provides a connector 211 that couples MP chip 200 to larger processing system such as MP 100 of FIG. 1 via pins 213.

When the MP is initially activated for processing, one IA-32 processor is held off as a spare processor. Holding off the processor involves having the basic input output system (BIOS) recognize the processor as a spare during BIOS boot (i.e., power on self test (POST), etc. of the MP and having the BIOS respond by not enabling the spare processor to be initially allocated for OS and application processing. This particular set-up of the MP may require some administrative input and support. However, in one embodiment, the processor initialization/identification code includes a software tag to identify the processor as a spare processor to the OS and other components. The other processors are initiated and identified to the OS for regular processing.

In one embodiment, during boot, BIOS utilizes advanced configuration and power interface (ACPI) specification and/or the S3 state to put the processor in a low-power, standby, or "off" state. The S3 state is a computer sleep state defined by the ACPI specification in which the system is not powered nor running, but the memory remains intact, powered and in a continuous refresh cycle. This initial removal of the spare processor from the group of executing processors occurs before the BIOS hands over control to the OS. In another embodiment the system is made to enable the "hot spare processor" feature on-the-fly by the OS with a driver-OS-SMI handshake. Tracking which processors are active may be completed by an software table of active processors, which is available to be read by the OS, when determining work load allocation to each of the active processors.

Notably, the present invention maintains system uptime even while a processor in the MP is failing. This feature of the invention is particularly applicable to operations in a critical server environment that requires continuous uptime of the system.

The spare processor remains hidden until one of the primary processors fails and the spare processor is needed to replace the failing processor. As illustrated in FIG. 2B, the spare processor may be built on the same board as the main processors. However, in another implementation, the spare processor is provided on a separate processing board to make serviceability easier. For example, with the spare processor operation for Series x440 models, the bottommost board with CPU's is identified as the ideal board on which to reserve a hot-spare CPU(s), since the bottom CPU board is not as accessible. This enables a failed CPU to be disabled while the OS remains running.

The spare processor is interconnected similarly to each primary processor with the exception that BIOS does not initialize the spare nor initially present the spare processor to the OS following the POST. During POST, BIOS hides the spare processor from the OS. This is accomplished either through a setup of the MP table and/or an ACPI setup. The BIOS brings the spare processor all the way online, then puts it into a spin lock (i.e., a tight software loop in the SMI handler). This has the effect of completely hiding the processor from the OS until the spare processor is needed. Once processor failure occurs and the spare processor is activated, the spare processor is then placed under complete OS control.

Possible triggers for the failure-response features of the invention includes the following: (1) CPU thermal trends are observed by a system management utility, which may be hardware (HW), firmware (FW), and/or software (SW). In one implementation, the system manager utility also provides an SMI handler itself; (2) The CPU temperature goes over or near some operational breaking point; and (3) The system management entity causes an SMI to be invoked, indicating which CPU is to be off-loaded to the hot spare CPU.

Implementation of the invention involves the utilization of Systems Management Interrupt (SMI) functionality provided within basic input output system (BIOS) of the IA-32 systems. At least one processor of the multiprocessor system is reserved as a hot-spare processor that remains in an idle, off, or low-power mode. While in that mode, the OS is prevented from initially utilizing the hot-spare processor. When a processor failure is detected, SMI code running on a good processor instructs the OS to hold off allocating processes to the failing processor. Contemporaneously, the SMI (and OS) activates and completes an initialization of the hot-spare processor to prepare it to begin receiving the held-off processes. Control is then returned to the OS, which updates the "active" processor list and allocates the threads that were running on the failing processor to the hot-spare processor.

The SMI is generated by hardware during various processor failure conditions. During an SMI, the system state of each processor is completely saved to memory and the caches and pipelines are flushed. A BIOS interrupt handler (i.e., the SMI handler) then takes control of the system until a resume (RSM) instruction is performed by the OS. The SMI handler is utilized to allow BIOS to swap out processors. The BIOS places the failing processor in a halt state and contemporaneously brings the standby processor out of the held-off state and into an active state. Additionally, the BIOS switches the memory save state from the old processor to the new processor. In one embodiment, the above processes are accomplished by providing a software register of active processors in the OS and setting the register to reflect the spare processor as active and the failing processor as inactive.

In the present invention also, SMI allows BIOS to detect a failure and control the reallocation of processing from a good CPU to the hot spare CPU. The SMIs are generated through hardware, and an internal monitoring mechanism is provided for each processor or group of processors that generates the SMI. In the described embodiment, the specific processor-fault SMI is generated when a processor is failing. The SMI identifies to the OS and the BIOS which one of the processors is failing. SMIs are invoked periodically and/or asynchronously by the hardware or other system events, and possibly by software control. A description of the functionality and utilization of the SMI and SMI handler is described in detail in U.S. Pat. No. 6,463,492.

Whenever a CPU fault occurs, an SMI is automatically generated by the existing hardware, as described in the above referenced patent. The SMI is utilized as a trigger that initiates the activation of the spare processor by the BIOS. Notably, unlike with other conventional methods, no hardware switching logic is needed to accomplish the fail-over process of the invention. That is, the invention provides a software-only solution for processor failure response.

Thus, a processor is able to autonomously fail-over to a hot-spare processor without affecting the OS or executing applications. The invention substantially eliminates the problems related to high availability during single processor failure without crashing all of the processors. Further, the invention completes this solution in a way that also does not require specialized OS or middleware features. Finally, the invention provides a method for hot swap spare processors without the need of processor architecture changes. That is, no special hardware instruction is required built into the processor as in other methods.

Figure 3:
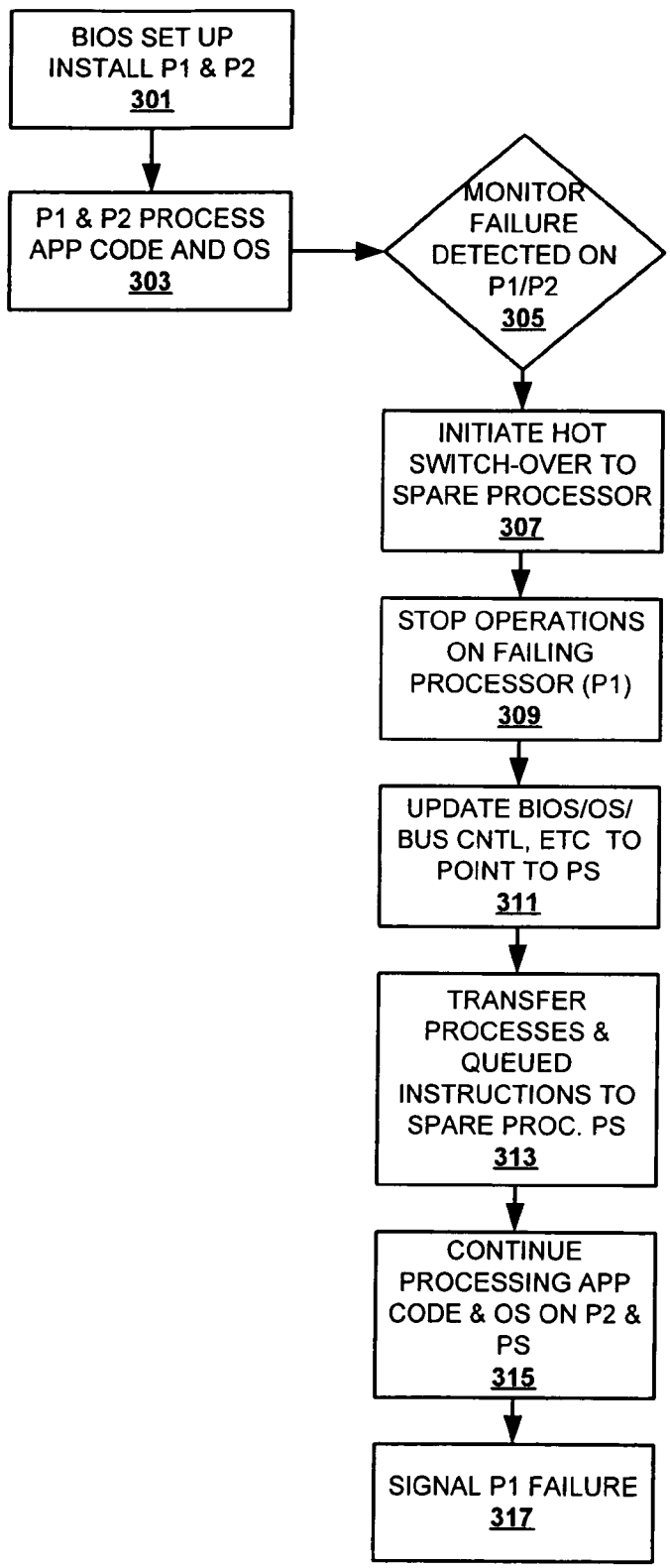
FIG. 3 is a flow chart illustrating the process of detecting and responding to processor failure with the spare processor configuration of FIGS. 1 and 2B according to one embodiment of the present invention.

FIG. 3 is a flow chart illustrating the process of failure detection and response according to one implementation of the invention. For simplicity, the process is described with reference to the MP and processor configuration of FIGS. 1 and 2A, 2B. As provided at block 301, the process begins with the BIOS setting up and installing the main processors, P0 and P1, during the initial POST of the MP. The presence of the spare processor is registered in the BIOS and that processor is initially left in power-down (held-off) or inactive mode. The OS and applications are not provided with an indication of the spare processor, so no operations are initially allocated to that processor. The primary processors commence processing application code and OS operations on the MP, as shown at block 303. The system monitors the processors for a detection of failure on one of the processors, and a determination is made at block 305 whether a failure is detected. In one implementation, the processors detect failure within their subsystem, generating a processor fault SMI, and message the failure to the SMI handle. If no failure occurs, the processing of application and OS continues as normal on the main processors.

If failure is detected, however, the receipt of a processor fault SMI by the OS immediately activates a switch over response to replace the failing processor with the spare processor as indicated at block 307. The spare processor is brought out of the held-off state. Concurrently, processes (instructions, threads, etc.) initially allocated to the failing processor are held by the OS and processing on the failing processor is stopped as shown at block 309. Once the spare processor has been successfully brought on line, the BIOS (table) is updated and the OS, bus controllers, etc. are messaged to change their configurations to reflect a processor change from the failing processor to the spare processor as shown at block 311. The processes initially allocated to the failing processor are sent to the spare processor as indicated at block 313, and the application code and OS continue processing on the processors that are now functional (i.e., the other main processor and the spare processor) as provided at block 315. Notably, for this seamless transfer to be possible, all processors in the system must be identical or process instructions in an identical manner. Otherwise a degradation or improvement in processing may become noticeable and affect overall throughput. Once the fail-over to the spare processor has been completed, a signal/message is generated indicating (to the administrator) that the processor has failed and is replaced with a spare, as shown at block 317. Then the process ends as depicted at block 319.

The invention provides a method for hot swap spare processors without the need of processor architecture changes, i.e., without requiring a hardware instruction built into the processor. The invention provides high availability of processing resources and eliminates delays due to personal switching out failing processors manually. Further, the invention completes this solution in a way that also does not require specialized OS or middleware features.

The present invention provides several advantages over other available methods including: (1) no specialized software is needed because SMI is in BIOS, and the reaction to a failing processor is automatic. Also, (2) using an SMI, a service processor is able to identify a failing processor & halt its execution from an outside perspective, unlike the limitation with a software limitation. Furthermore, (3) an alert about a hot-spare processor switching event can be generated.

The other software methods do not utilize SMIs or SMI functionality and encounter several drawbacks, including (1) customers must purchase the OS/software license that provides the hot-spare-processor feature, since not all OSes support this feature; and (2) the OS that has to make the decision to switch to a hot spare processor may be running decision threads atop the faulting processor, leading to incorrect code execution.

While the invention has been particularly shown and described with reference to a preferred embodiment, it will be understood by those skilled in the art that various changes in form and detail may be made therein without departing from the spirit and scope of the invention.

What is claimed is:

1. In a multiprocessor data processing system (MP) configured according to IA-32 architecture, a method for dynamically providing spare processor resources when an operating processor fails, said method comprising:

holding-off a spare processor during a POST (power on self test), wherein said spare processor is available within said MP along with at least two operating processors, and said spare processor is not allocated any processing load by the operating system (OS) following the POST, wherein said MP includes a basic input/output system (BIOS) and a processor register linked to said BIOS, which indicates which processors among said operating processors and said spare processors are currently available to said OS for allocating load, wherein said holding off of the spare processor comprises:

setting a bit within said register corresponding to each of said operating processors to an active state during said initial POST, wherein said active state indicates to said OS that the corresponding operating processor is available for allocating load; and setting a bit corresponding to said spare processor to an inactive state; and when one of the operating processors is determined to be failing, dynamically activating said spare processor to replace the failing operating processor, wherein the processing load of the failing processor is automatically sent to the spare processor for processing.

2. The method of claim 1, wherein said dynamically activating step comprises:

re-setting a bit corresponding to the failing processor to an inactive state; and setting said bit corresponding to said spare processor to an active state.

3. The method of claim 1, wherein said holding off step comprises:

placing said spare processor in a low-power, standby state during system boot utilizing advanced configuration and power interface (ACPI) of the BIOS; and subsequently handing off control of said MP from said BIOS to the OS.

4. The method of claim 1, wherein said holding off step comprises:

placing said spare processor in an S3 state during system boot utilizing advanced configuration and power interface (ACPI) of the BIOS; and subsequently handing off control of said MP from said BIOS to the OS.

5. The method of claim 1, wherein said holding off step further comprises:

bringing said spare processor online during BIOS boot and then placing the spare processor into a spin lock.

6. The method of claim 1, further comprising generating a message signaling said processor failure to a system administrator.

7. The method of claim 1, wherein said dynamically activating step comprises completing a driver-OS-SMI handshake operation.

8. In a multiprocessor data processing system (MP) configured according to IA-32 architecture, a method for dynamically providing spare processor resources when an operating processor fails, said method comprising:

holding-off a spare processor during a POST (power on self test), wherein said spare processor is available within said MP along with at least two operating processors, and said spare processor is not allocated any processing load by the operating system (OS) following the POST; and when one of the operating processors is determined to be failing, dynamically activating said spare processor to replace the failing operating processor, wherein the processing load of the failing processor is automatically sent to the spare processor for processing, wherein said dynamically activating includes:

activating a system management interrupt (SMI) when said failing processor is determined to be failing, wherein said SMI messages said OS to hold off allocation of said processing load to said failing processor;

saving a system state of each processor to memory;

activating an SMI handler to temporarily take control of said system from said OS while said spare processor is being activated;

swapping out the failing processor for the spare processor;

updating system configuration parameters, including bus controller, memory and OS parameters, to reflect switch over to said spare processor from said failing processor; and restoring control to said OS once said spare processor has been activated.

9. The method of claim 8, further comprising enabling OS updates to an active processor lists, wherein said OS begins allocating threads previously running on said failed processor to said spare processor.

10. A multiprocessor data processing system (MP) configured according to IA-32 architecture, comprising:

a plurality of processors having at least two main operating processors and a spare processor;

a memory coupled to said plurality of processors;

an operating system (OS) that controls work allocation to each of said plurality of processors;

a basic input output system (BIOS) that supports system management interrupt (SMI);

means for holding-off the spare processor during a POST (power on self test), wherein said spare processor is not allocated any processing load by the operating system (OS) following a power-on self test (POST), said means including:

a processor register linked to said BIOS, which indicates which processors among said operating processors and said spare processors are currently available to said OS for allocating load; and means for setting a bit within said register corresponding to each of said operating processors to an active state during said initial POST, wherein said active state indicates to said OS that the corresponding operating processor is available for allocating processing load, wherein further a bit of said spare processor is set to an inactive states; and means, when one of the operating processors is determined to be failing, for dynamically activating said spare processor to replace the failing operating processor, wherein the processing load of the failing processor is automatically sent to the spare processor for processing.

11. The MP of claim 10, wherein said means for dynamically activating comprises:

means for re-setting a bit corresponding to the failing processor to an inactive state; and means for setting the bit corresponding to said spare processor to an active state.

12. A multiprocessor data processing system (MP) configured according to IA-32 architecture, comprising:

a plurality of processors having at least two main operating processors and a spare processor;

a memory coupled to said plurality of processors;

an operating system (OS) that controls work allocation to each of said plurality of processors;

a basic input output system (BIOS) that supports system management interrupt (SMI);

means for holding-off the spare processor during a POST (power on self test), wherein said spare processor is not allocated any processing load by the operating system (OS) following a power-on self test (POST); and means, when one of the operating processors is determined to be failing, for dynamically activating said spare processor to replace the failing operating processor, wherein the processing load of the failing processor is automatically sent to the spare processor for processing, said means including:

means for activating a system management interrupt (SMI) when said failing processor is determined to be failing, wherein said SMI messages said OS to hold off allocation of said processing load to said failing processor.

means for saving a system state of each processor to memory;

means for activating an SMI handler to temporarily take control of said system from said OS while said spare processor is being activated;

means for swapping out the failing processor for the spare processor;

means for updating system configuration parameters, including bus controller, memory and OS parameters, to reflect switch over to said spare processor from said failing processor; and means for restoring control to said OS once said spare processor has been activated.

13. The MP of claim 12, wherein said means for holding off comprises:

means for placing said spare processor in a low-power, standby state during system boot utilizing advanced configuration and power interface (ACPI) of the BIOS; and means for subsequently handing off control of said MP from said BIOS to the OS.

14. The MP of claim 12, wherein said means for holding off comprises:

means for placing said spare processor in an S3 state during system boot utilizing advanced configuration and power interface (ACPI) of the BIOS; and means for subsequently handing off control of said MP from said BIOS to the OS.

15. The MP of claim 12, wherein said means for holding off further comprises BIOS means for bringing said spare processor online and then placing the spare processor into a spin lock.

16. The MP of claim 12, further comprising generating a message signaling said processor failure to a system administrator.

17. The MP of claim 12, wherein said means for dynamically activating comprises means for completing a driver-OS-SMI handshake operation.

18. The MP of claim 12, further comprising means for enabling OS updates to an active processor lists, wherein said OS begins allocating threads previously running on said failed processor to said spare processor.

19. The MP of claim 12, wherein further:

said plurality of processors are configured with said at least two main processors on a first processing board and said spare processor on a second processing board, wherein said second processing board is a processing board among a plurality of processing boards containing a processor within the MP that is most difficult to access.

* * * * *